(12) United States Patent
Nguyen et al.

(10) Patent No.: US 12,741,556 B2
(45) Date of Patent: Sep. 22, 2026

(54) POWER CONTROL SYSTEM WITH A POWER SPLITTER MODULE

(71) Applicant: GM Global Technology Operations LLC, Detroit, MI (US)

(72) Inventors: Minh-Khai Nguyen, Troy, MI (US); Lei Hao, Troy, MI (US); Samantha Gunter Miller, Berkley, MI (US); Firas Shabo, Shelby Township, MI (US); Chandra S. Namuduri, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 16 days.

(21) Appl. No.: 18/955,889

(22) Filed: Nov. 21, 2024

(65) Prior Publication Data

US 2026/0138479 A1 May 21, 2026

(51) Int. Cl.

*H02J 7/00* (2026.01)
*B60L 1/00* (2006.01)
*B60L 50/60* (2019.01)
*B60L 53/60* (2019.01)
*H02J 7/02* (2016.01)
*H02J 7/14* (2006.01)

(52) U.S. Cl.

CPC ............... *B60L 53/60* (2019.02); *B60L 1/006* (2013.01); *B60L 50/60* (2019.02); *H02J 7/02* (2013.01); *B60L 2210/20* (2013.01)

(58) Field of Classification Search

CPC .......... B60L 53/60; B60L 1/006; B60L 50/60; B60L 2210/20; H02J 7/02

See application file for complete search history.

(56) References Cited

U.S. PATENT DOCUMENTS

2023/0011289 A1* 1/2023 Kim .................... H02M 1/4233
2024/0072544 A1 2/2024 Horn et al.

FOREIGN PATENT DOCUMENTS

CN 209102884 U * 7/2019
WO WO-2012164681 A1 * 12/2012 ............. B60L 53/18
WO WO-2024186042 A1 9/2024

OTHER PUBLICATIONS

Nguyen, M. et al., “Power Control System With a Power Splitter,” U.S. Appl. No. 18/955,902, filed Nov. 21, 2024.

Nguyen, M. et al., “Alternating Current to Alternating Current Converter for Vehicle-To-Load Electrical Power,” U.S. Appl. No. 18/620,114, filed Mar. 28, 2024.

* cited by examiner

*Primary Examiner* — Elim Ortiz

(74) *Attorney, Agent, or Firm* — Honigman LLP; Matthew H. Szalach

(57) ABSTRACT

Provided is a power control system, for providing power to a load and a battery from a first power source. The first power source transmits electric power at a predetermined voltage to an onboard charging control module which regulates the power to charge a battery. The onboard charging module is configured to process the electric power from the first power source to charge the battery. A splitter module is interposed between the first power source and the onboard charging control module. The splitter module is configured to direct electric power from the first power source to the load. Accordingly, power may be supplied to load while the battery is being charged.

20 Claims, 4 Drawing Sheets

POWER CONTROL SYSTEM WITH A POWER SPLITTER MODULE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a power distribution system for charging a battery. For instance, an electric vehicle includes a battery for powering a motor to drive the vehicle and vehicle electric components such as a head unit, lights, air conditioning and the like. Some electric vehicles include one or more outlets that users may use to power personal electric devices such as cellular phones and tablets.

The electric vehicle further includes an inlet for accepting power from a charger coupled to a power utility station to charge the battery. The inlet may be configured to accept alternating current ("AC") at 120 volts or at 240 volts. The charging power is regulated and controlled by an on-board charging control module ("OBCM"). Currently, the OBCM shuts off power to the outlets in the electric vehicle when the battery is being charged to facilitate the regulation and control of power to the battery when the charger is plugged into the inlet.

Many electric devices that may be plugged into a vehicle outlet are configured to receive 120 volts of AC power. Thus, plugging such electric devices directly into a charger receiving power from a 240-volt source may damage the electric device. Further, such electric devices may be configured to operate using power having different wave forms.

Accordingly, it is desirable to have a power distribution system wherein outlets may be operable to distribute power when the battery is being charged. It is further desirable to have a power distribution configured to step up or step down the power from a power source to provide power for a predetermined electric device. It is further desirable to adjust the wave form of the power to accommodate a predetermined electric device.

SUMMARY

One aspect of the disclosure provides a power control system for providing power to a load and a battery from a first power source. The first power source is configured to transmit electric power in the form of an alternating current. The power control system includes an onboard charging control module and a splitter module. The onboard charging module includes a first processing unit that is configured to process the electric power from the first power source to charge the battery. The splitter module is interposed between the first power source and the onboard charging control module. The splitter module is configured to direct electric power from the first power source to the load. For instance, the splitter module may be configured to supply power to an outlet to which the load may be coupled. Accordingly, power may be supplied to the load while the battery is being charged.

Implementations of the disclosure may include one or more of the following optional features. In some implementations, the splitter module includes an alternating current-alternating current converter (AC-AC converter) configured to regulate the power from the first power source.

In some examples, the onboard charging control module may be configured to provide a galvanic isolation between the load and the battery.

In some configurations, the splitter module may be configured to change a voltage of the electric power. For instance, the splitter module may be configured to step up or step down the voltage.

In some implementations the splitter module may include various configurations. For example, the splitter module may include a sensing unit configured to measure a value of at least one of a current and a voltage and/or the splitter module may include a switch operable to bypass or engage the AC-AC converter. Further, the splitter module may include a second processing unit, the second processing unit receiving the measured value of at least one of the current and the voltage to actuate the switch.

In some configurations, the second processing unit may be further configured to actuate the AC-AC converter to generate a predetermined waveform. For example, the first processing unit of the onboard charging control module may be configured to transmit charging information of the battery to the second processing unit of the AC-AC converter, wherein the second processing unit processes the charging information to control the switch and maintain a desired waveform.

In some configurations, the AC-AC converter illustratively includes one of a buck converter, buck-boost converter, and single-ended-primary-inductor converter.

In some configurations, the onboard charging control module and the splitter module are integrated as a single module.

Another aspect of the disclosure provides an electric vehicle including a battery, an inlet, and an outlet. The battery is configured to power a drive force of the electric vehicle. The inlet is configured to receive electric power from a first power source and the outlet is configured to power a load. The electric vehicle further includes an onboard charging control module electrically coupled to the inlet. The onboard charging control module includes a first processing unit configured to process the electric power from the first power source to charge the battery. The electric vehicle further includes a splitter module electrically coupled to the outlet. The splitter module is interposed between the inlet and the onboard charging control module to direct electric power from the first power source to the outlet to power the load while simultaneously charging the vehicle.

This aspect of the disclosure may include one or more of the following optional features. In some examples, the splitter module may be configured to change a voltage of the electric power. For example, the splitter module is configured to step down a voltage of the first power source. In such an example, the splitter module may include a sensing unit configured to measure a value of at least one of a current and a voltage and/or a switch operable to bypass or engage an AC-AC converter.

In some implementations, the splitter module may include a second processing unit, the second processing unit receiving the measured value of at least one of the current and the voltage to actuate the switch. The second processing unit may be further configured to actuate the AC-AC converter to generate a predetermined waveform.

In some implementations the first processing unit of the onboard charging control module may transmit a charging information of the battery to the second processing unit of the AC-AC converter, wherein the second processing unit processes the charging information to control the switch and maintain the desired waveform.

In some implementations the outlet is one of a two-prong and a three-prong outlet.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
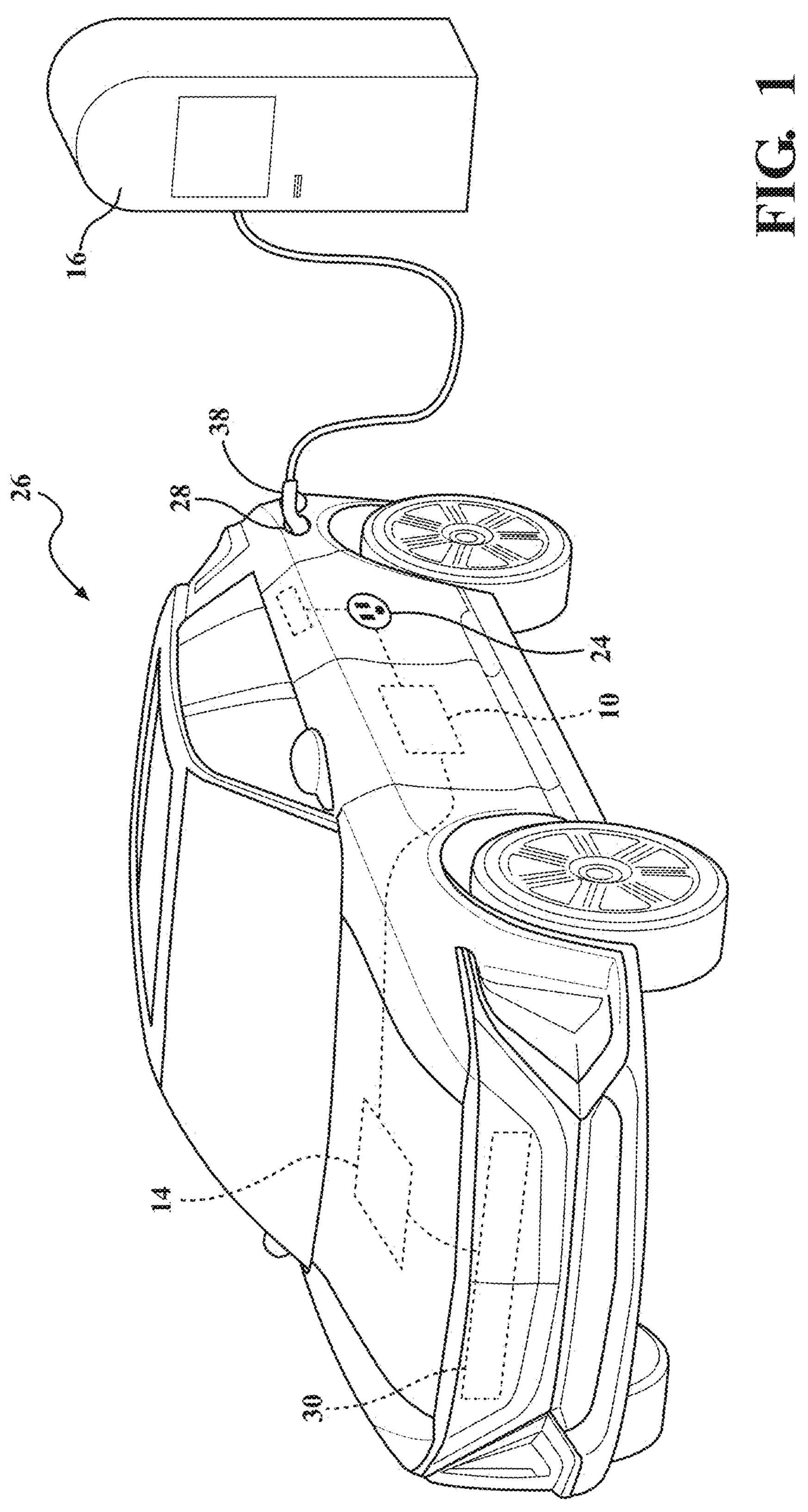
FIG. 1 is a perspective view of a vehicle showing a power control system of the vehicle coupled to a first power source.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The present disclosure relates to a power control system 10 for providing power to a load 12 and a battery 14 from a first power source 16. The first power source 16 transmits electric power in the form of an alternating current at a predetermined voltage to an onboard charging control module 18 which regulates the power to charge a battery 14. The first power source 16 may be a commercially developed charging station configured to provide electrical power at 240 volts or may be a residential outlet configured to provide power at 120 volts.

The onboard charging control module 18 includes a first processing unit 20 that is configured to process the electric power from the first power source 16 to charge the battery 14. A splitter module 22 is interposed between the first power source 16 and the onboard charging control module 18. The splitter module 22 is configured to direct electric power from the first power source 16 to the load 12. For instance, the splitter module 22 may be configured to supply power to an outlet 24 disposed in the vehicle 26 to which the load 12 may be coupled. The outlet 24 may be a standard two or three prong outlet for United States purposes or a two prong outlet for European purposes. Accordingly, power may be supplied to load 12 while the battery 14 is being charged.

The power control system 10 may be implemented in any platform or device that utilizes a battery 14 to power the device, such as a motor for propelling the device. For illustrative purposes, the power control system 10 is described in the context of an electric vehicle 26 as shown in FIG. 1. However, it should be appreciated that the power control system 10 may be implemented in other devices/platforms having a battery 14 for powering the device/platform and an outlet 24 for powering a load 12, such a device/platform illustratively includes a boat, a motorcycle, a residential or commercial building and the like.

FIG. 1 depicts the vehicle 26 coupled to the first power source 16. In particular, the vehicle 26 includes a charging inlet 28 and the first power source 16 includes a charger 38 configured to be coupled with the charging inlet 28 to provide power to charge the battery 14. The first power source 16 is illustratively shown as a commercial charging station, but it should be appreciated that the first power source 16 may be a residential outlet as well.

The vehicle 26 is an electric vehicle 26 having a battery 14 configured to power a motor 30 for driving the vehicle 26. For instance, the motor 30 may be an electric motor 30 configured to generate as much as 200 horsepower to drive the vehicle 26. Any battery 14 configured to be charged with electrical power currently known or later developed may be modified for use herein, illustratively including lithium-ion batteries, solid state batteries, and the like. The capacity of the battery 14 need not be limiting and may include batteries 14 having a capacity greater than 30 kilowatts (kW). The battery 14 is further configured to power the various electronic components within the vehicle 26. Such electronic components are well known and illustratively include lights, windshield wipers, a head unit, heating and air conditioning systems and the like.

Figures 2, 3:
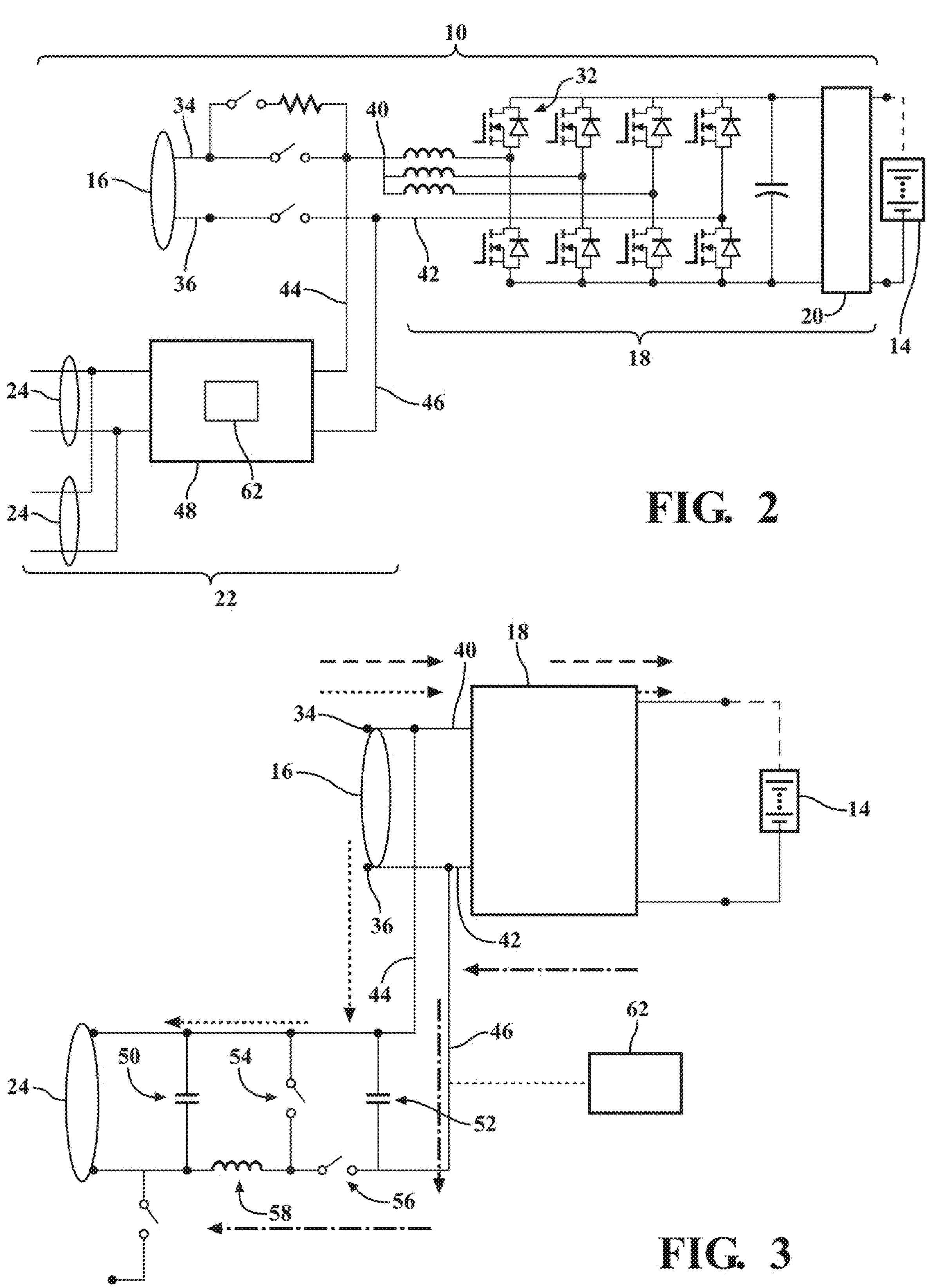
FIG. 2 is a schematic view of the power control system shown in FIG. 1.
FIG. 3 is a schematic view of an AC-AC converter of a splitter module shown in FIG. 2.

With reference now to FIGS. 2 and 3, the power control system 10 includes an onboard charging control module 18 and a splitter module 22. In some configurations, the onboard charging control module 18 and the splitter module 22 are integrated as a single module. In other configurations, the onboard charging control module 18 and the splitter module 22 are separate units. The onboard charging control module 18 is configured to regulate power from the first power source 16 to charge the battery 14. For instance, the onboard charging control module 18 may include electronic circuits and components configured to filter noise, maintain the power supplied to the battery 14 at a predetermined voltage, maintain a predetermined waveform, and perform other routine processes to provide the battery 14 with power that is optimal for charging operations. For example, the onboard charging control module 18 may include a power factor correction circuit configured to regulate power to the battery 14 and a power outlet(s) 24 within the vehicle 26.

The onboard charging control module 18 includes switches 32, such as MOSFET switches, which may be turned on and off to regulate a duty cycle of the electric power, step up or step down the voltage, and change the waveform of the electric power supplied to the battery 14. The onboard charging control module 18 may be further configured to provide a galvanic isolation between the load 12 and the battery 14. For instance, the onboard charging control module 18 may further include an isolated DC-DC converter, which may include a transformer. The operation of the transformer provides a galvanic isolation between the load 12 and the battery 14.

The onboard charging control module 18 may include a first processing unit 20 that is configured to actuate the electronic components, such as the switches 32, to process the electric power from the first power source 16 to charge the battery 14. The first processing unit 20 includes written instructions for the execution of the electronic components. The instructions may be stored on a non-volatile memory, which may be updated as needed.

With reference again to FIG. 2 and now to FIG. 3, the power control system 10 includes a splitter module 22 that is interposed between the first power source 16 and the onboard charging control module 18. In one aspect, the first power source 16 includes a first output line 34 and a second output line 36, wherein power is delivered from the first output line 34 and the second output line 36. In such an aspect, the second output line 36 is a neutral line to create a power differential with respect to the first output line 34 for the delivery of power. The first output line 34 and the second output line 36 may be housed within a charger 38 of the first power source 16 and is configured to couple with the charging inlet 28 disposed on the vehicle 26. The onboard charging control module 18 includes a first input line 40 and a second input line 42 configured to be electrically coupled to the first output line 34 and the second output line 36 respectively to receive power from the first power source 16. The first input line 40 and the second input line 42 are electrically coupled to the electronic components of the onboard charging control module 18, which regulates the power delivered.

The splitter module 22 includes a third input line 44 and a fourth input line 46 configured to direct electric power from the first power source 16 to the load 12. The third input line 44 and the fourth input line 46 are electrically coupled to the first output line 34 and the second output line 36, respectively. It should be appreciated that the first input line 40, the second input line 42, third input line 44, and the fourth input line 46 may be housed in the charging inlet 28. It should be appreciated that the splitter module 22 may not necessarily provide a direct electric coupling to the load 12 but may be configured to supply power to the outlet 24 to which the load 12 may be coupled. Accordingly, power may be supplied to the load 12 while the battery 14 is being charged. It should be appreciated that the first output line 34, the second output line 36, the first input line 40, the second input line 42, third input line 44, and the fourth input line 46 may be formed of an electrically conductive wire or a cable formed of a plurality of electrically conductive wires.

With reference again to FIG. 2 and now to FIG. 3, the splitter module 22 includes an AC-AC converter 48 configured to regulate the power from the first power source 16. Any AC-AC converter 48 currently known or later developed may be modified for use herein, illustratively including a buck converter, buck-boost converter, single-ended-primary-inductor 58 converter, a switch-capacitor AC-AC converter, and a back-to-back AC-AC converter.

In one aspect, the AC-AC converter 48 includes a first capacitor 50 and a second capacitor 52 interconnecting the third input line 44 to the fourth input line 46. A first switch 54 is interposed between the first capacitor 50 and the second capacitor 52, so as to be in parallel with the third input line 44 and the fourth input line 46 and connects or disconnects power between the third input line 44 and the fourth input line 46. A second switch 56 is disposed on the fourth input line 46 that is electrically connected to the second output line 36. The second switch 56 is also interposed between the first switch 54 and the second capacitor 52. The AC-AC converter 48 may further include an inductor 58 disposed on the on the fourth input line 46 and is in series with the second switch 56. The inductor 58 is interposed between the first switch 54 and the first capacitor 50. By operation of the first switch 54 and the second switch 56, the splitter module 22 may be configured to change a voltage and waveform of the electric power. For instance, the splitter module 22 may be configured to step up or step down the voltage provided to the load 12.

Figure 4:
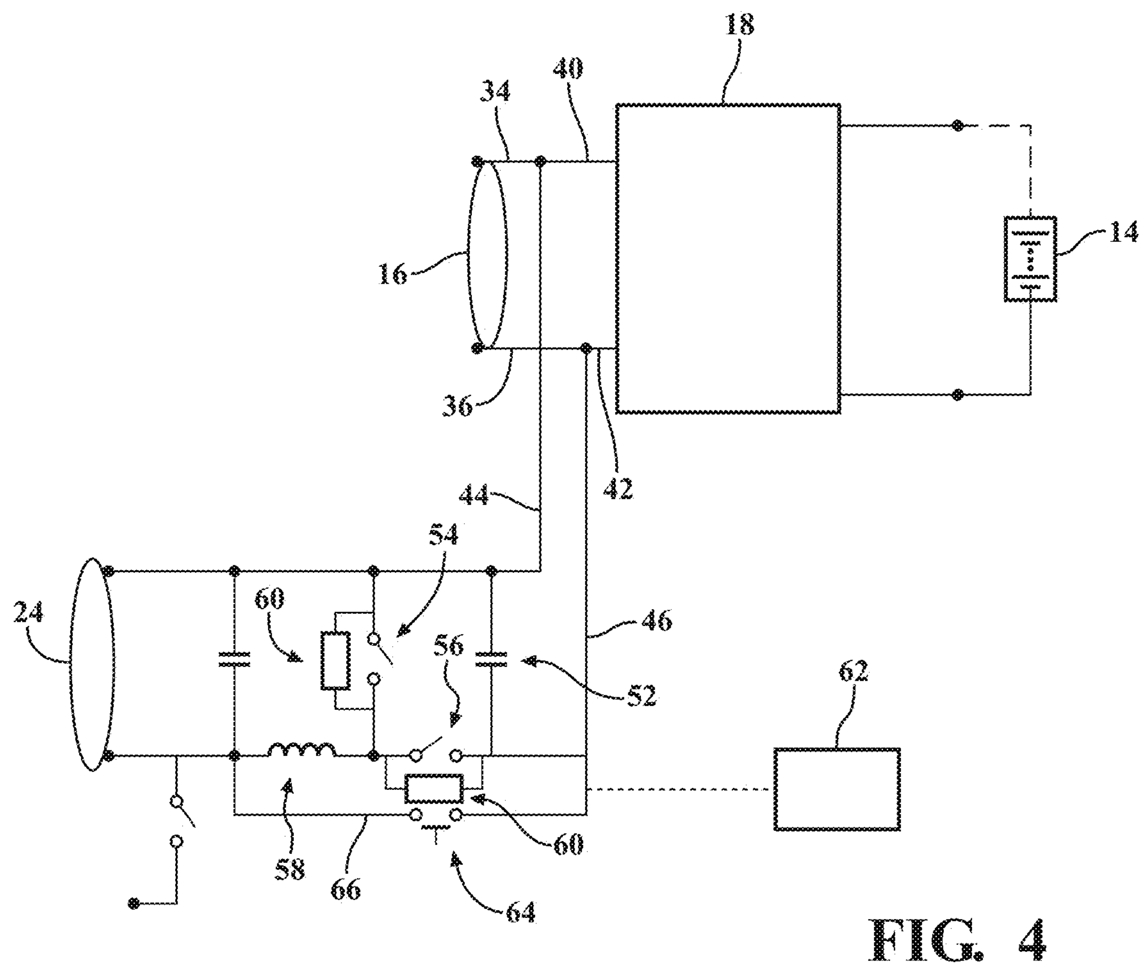
FIG. 4 is a schematic view of a splitter module configured to bypass the AC-AC converter.

With reference now to FIG. 4, the splitter module 22 be configured to bypass the AC-AC converter 48. For example, the splitter module 22 may include a sensing unit 60 configured to measure a value of at least one of a current and a voltage. The sensing unit 60 may be any current or voltage sensor currently known or later adapted may be modified for use herein to include a resistor, a diode, a combination of a resistor and diode, or the like. The sensing unit 60 is operably coupled to a respective first switch 54 and second switch 56 to detect or otherwise sense the current and/or voltage at the first switch 54 and the second switch 56. The sensing unit 60 is communicatively coupled to a second processing unit 62 which is configured to measured value of the voltage and/or current to control the operation of the first switch 54 and the second switch 56.

The splitter module 22 may include a third switch 64 operable to bypass or engage the AC-AC converter 48. In such an aspect, the splitter module 22 includes a fifth input line 66 coupled in parallel with the fourth input line 46 wherein the inductor 58, the first switch 54, and the second switch 56 are bypassed.

The second processing unit 62 receives the measured value of at least one of the current and the voltage to actuate the third switch 64. Thus, in cases where the first power source 16 provides power at 240 volts, the sensing units 60 detects the voltage and/or current and the second processing unit 62 keeps the third switch 64 off so as to direct power to the AC-AC converter 48. In such a case, the second processing unit 62 further actuates the first switch 54 and the second switch 56 to step down the power to 120 volts to generate a predetermined duty cycle so as to output a waveform suitable for commercial electronic devices such as laptop computers and/or mobile devices. In cases where the first power source 16 provides power at 120 volts, the sensing units 60 detect that power is provided at 120 volts and the second processing unit 62 keeps the third switch 64 on to bypass the AC-AC converter 48. The 120 volts from the first power source 16 is output directly to the inlet.

Figure 5:
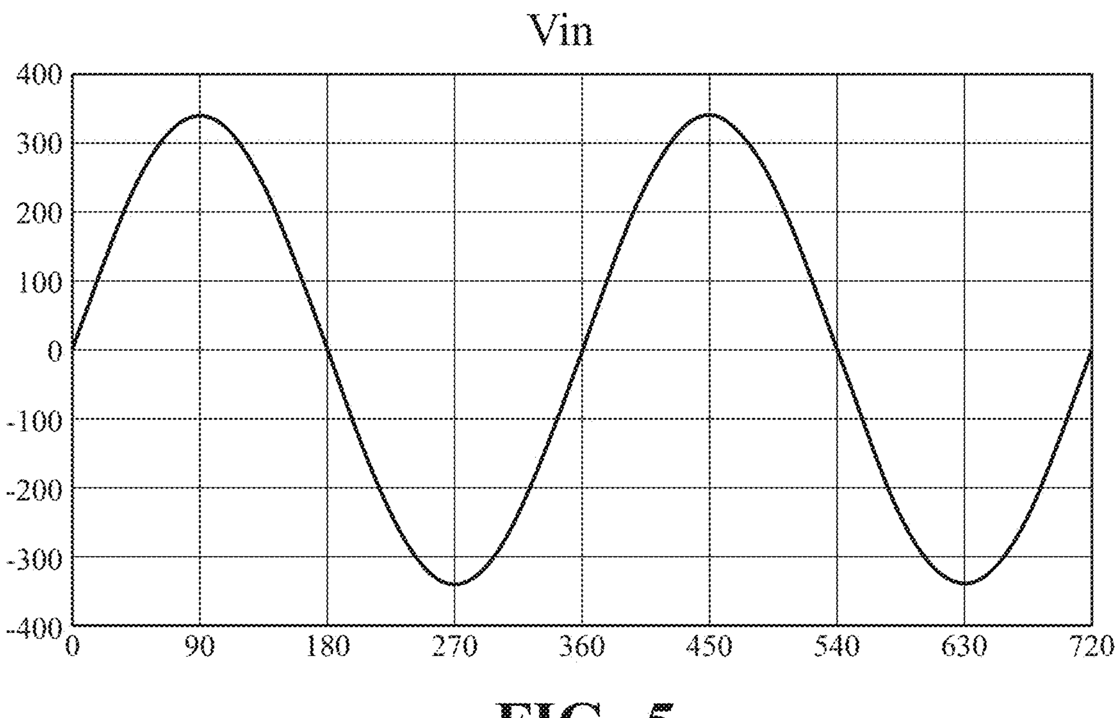
FIG. 5 is a diagram showing a waveform output from the first power source.
Figure 6:
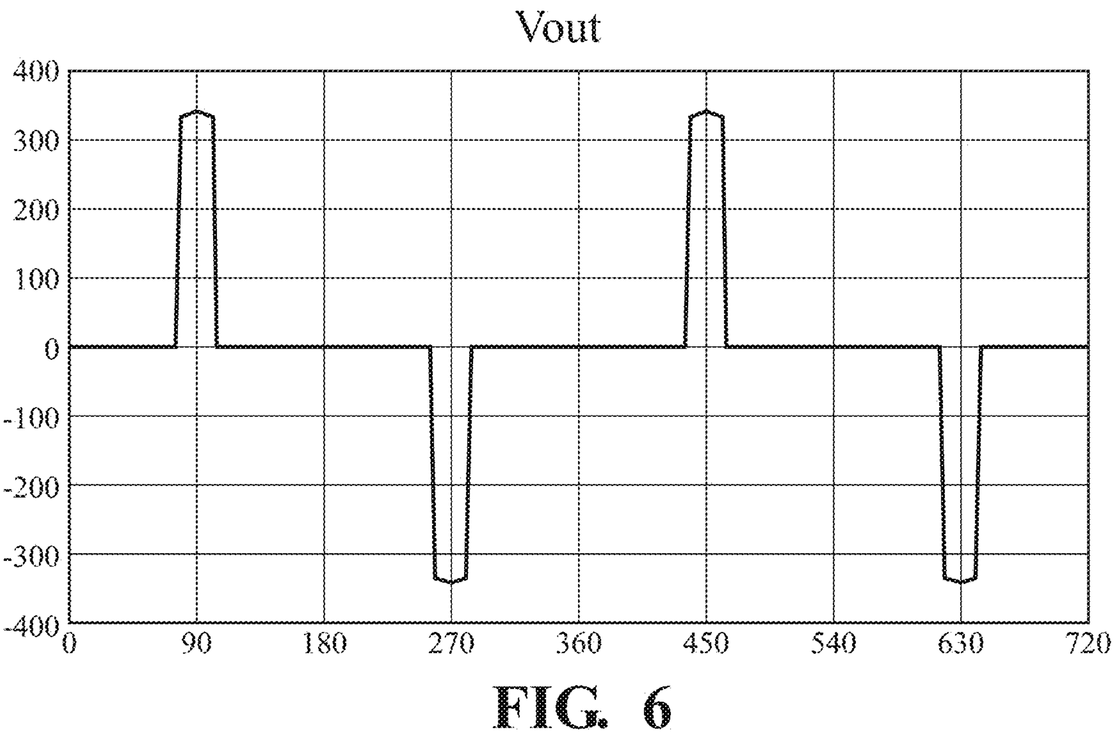
FIG. 6 is a diagram showing the waveform shown in FIG. 5 modified by the splitter module.

With reference now to FIGS. 5 and 6, a depiction of the waveform output by the splitter module 22 is provided. FIG. 4 shows an exemplary waveform output from the first power source 16. The waveform is generally a sinusoidal form which may not be optimal for some electronic devices. The second processing unit 62 may be further configured to actuate the AC-AC converter 48 to generate a predetermined waveform. For example, the first processing unit 20 of the onboard charging control module 18 may be configured to transmit charging information of the battery 14 to the second processing unit 62 of the AC-AC converter 48, wherein the second processing unit 62 processes the charging information to control the switch and maintain a desired waveform, as shown in FIG. 5. This may be done by the selective actuation of the first switch 54 and the second switch 56.

With reference again to FIGS. 3 and 4, an operation of the power control system 10 is provided. In operation, the charger 38 of the first power source 16 is coupled to the charging inlet 28. The splitter module 22 draws power from the first power source 16 to the outlet 24 disposed in the vehicle 26 as indicated by the dotted lines and power from the first power source 16 is directed to the onboard charging control module 18 as indicated by the dashed lines. In instances where the first power source 16 provides 240 volts of power, the AC-AC converter 48 steps down the power and may regulate the waveform of the power to provide 120 volts to the outlet 24, as shown in FIG. 3. Accordingly, the user may be able to power an electronic device while the vehicle 26 is being charged. In particular, the user may draw power directly from the first power source 16 as the battery 14 is being charged. In instances where the first power source 16 provides 120 volts of power, the AC-AC converter 48 may be by-passed as shown in FIG. 4. Accordingly, the user may be able to power an electronic device while the vehicle 26 is being charged. In particular, the user may draw power directly from the first power source 16 as the battery 14 is being charged. In both cases, the splitter module 22 may be further configured to modify the waveform of the power to a predetermined waveform.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A power control system for providing power to a load and a battery, the battery configured to power a motor, the power control system providing power to the load from a first power source, the first power source transmitting electric power in the form of an alternating current, the power control system comprising:

an onboard charging control module including a first processing unit configured to process electric power from the first power source to charge the battery, the first processing unit including a non-volatile memory that stores written instructions for the execution of the onboard charging control module; and a splitter module interposed between the first power source and the onboard charging control module, the splitter module directing electric power from the first power source to the load, wherein the splitter module includes an alternating current-alternating current converter (AC-AC converter), wherein the splitter module includes a sensing unit configured to measure a value of at least one of a current and a voltage, and wherein the splitter module includes a switch operable to bypass or engage the AC-AC converter.

2. The power control system as set forth in claim 1, wherein the onboard charging control module is configured to provide a galvanic isolation between the load and the battery.

3. The power control system as set forth in claim 1, wherein the splitter module is configured to change a voltage of the electric power.

4. The power control system as set forth in claim 1, wherein the splitter module includes a second processing unit, the second processing unit receiving the measured value of at least one of the current and the voltage to actuate the switch.

5. The power control system as set forth in claim 4, wherein the second processing unit is further configured to actuate the AC-AC converter to generate a predetermined waveform.

6. The power control system as set forth in claim 4, wherein the first processing unit of the onboard charging control module transmits charging information of the battery to the second processing unit of the AC-AC converter, wherein the second processing unit processes the charging information to control the switch and maintain a desired waveform.

7. The power control system as set forth in claim 1, wherein the AC-AC converter is one of a buck converter, buck-boost converter, and single-ended-primary-inductor converter.

8. The power control system as set forth in claim 1, wherein the onboard charging control module and the splitter module are integrated as a single module.

9. An electric vehicle including a battery for powering a drive force of the electric vehicle, an inlet for receiving electric power from a first power source and an outlet for powering a load, the electric vehicle comprising:

an onboard charging control module electrically coupled to the inlet, the onboard charging control module including a first processing unit configured to process the electric power from the first power source to charge the battery; and a splitter module electrically coupled to the outlet, the splitter module interposed between the inlet and the onboard charging control module, the splitter module directing electric power from the first power source to the outlet to power the load while simultaneously charging the electric vehicle, wherein the splitter module includes a sensing unit configured to measure a value of at least one of a current and a voltage, and wherein the splitter module includes a switch operable to bypass or engage an AC-AC converter.

10. The electric vehicle as set forth in claim 9, wherein the splitter module is configured to change a voltage of the electric power.

11. The electric vehicle as set forth in claim 10, wherein the splitter module is configured to step down a voltage of the first power source.

12. The electric vehicle as set forth in claim 9, wherein the splitter module includes a second processing unit, the second processing unit receiving the measured value of at least one of the current and the voltage to actuate the switch.

13. The electric vehicle as set forth in claim 12, wherein the second processing unit is further configured to actuate the AC-AC converter to generate a predetermined waveform.

14. The electric vehicle as set forth in claim 12, wherein the first processing unit of the onboard charging control module transmits charging information of the battery to the second processing unit of the AC-AC converter, wherein the second processing unit processes the charging information to control the switch and maintain a desired waveform.

15. The electric vehicle as set forth in claim 9, wherein the outlet is one of a two-prong and a three-prong outlet.

16. The power control system as set forth in claim 1, wherein the splitter module is configured to step up or step down a voltage provided to the load.

17. The power control system as set forth in claim 1, wherein the AC-AC converter includes a first capacitor and a second capacitor interconnecting a third input line to a fourth input line.

18. The power control system as set forth in claim 1, wherein the splitter module includes a fifth input line coupled in parallel with a fourth input line, and wherein when the switch is operable to bypass the AC-AC converter, the fifth input line bypasses the AC-AC converter.

19. The electric vehicle as set forth in claim 9, wherein the splitter module is configured to step up or step down a voltage provided to the load.

20. The electric vehicle as set forth in claim 9, wherein the AC-AC converter includes a first capacitor and a second capacitor interconnecting a third input line to a fourth input line.

* * * * *